(12) United States Patent
Shreiner (10) Patent No.: US 10,535,188 B2
(45) Date of Patent: Jan. 14, 2020

(54) TESSELLATION EDGE SHADERS

(71) Applicant: Apple Inc., Cupertino, CA (US)

(72) Inventor: David R. Shreiner, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 82 days.

(21) Appl. No.: 15/275,152

(22) Filed: Sep. 23, 2016

(65) Prior Publication Data

US 2018/0089890 A1 Mar. 29, 2018

(51) Int. Cl.
*G06T 17/20* (2006.01)
*G06T 15/00* (2011.01)
*G06T 7/13* (2017.01)

(52) U.S. Cl.
CPC ............... *G06T 17/20* (2013.01); *G06T 7/13* (2017.01); *G06T 15/005* (2013.01)

(58) Field of Classification Search
CPC .............................. G06T 17/20; G06T 17/205
USPC ........................................................ 345/423
See application file for complete search history.

(56) References Cited

U.S. PATENT DOCUMENTS

| | | | |
|---|---|---|---|
| 6,307,551 B1 * | 10/2001 | Gueziec | G06T 17/20 345/419 |
| 6,707,452 B1 | 3/2004 | Veach | |
| 6,940,505 B1 * | 9/2005 | Savine | G06T 17/20 345/419 |
| 8,120,607 B1 | 2/2012 | Legakis | |
| 8,605,104 B1 | 12/2013 | McAllister | |
| 9,076,260 B2 | 7/2015 | Goel | |
| 2004/0075655 A1 * | 4/2004 | Dunnett | G06T 17/20 345/418 |
| 2004/0181373 A1 * | 9/2004 | Lachman | G06F 17/5018 703/1 |
| 2004/0227755 A1 * | 11/2004 | Sfarti | G06T 17/20 345/423 |
| 2010/0214294 A1 | 8/2010 | Li | |
| 2011/0216068 A1 * | 9/2011 | Sathe | G06T 17/20 345/441 |
| 2013/0257891 A1 | 10/2013 | Sathe | |
| 2014/0063013 A1 * | 3/2014 | Goel | G06T 15/005 345/423 |

* cited by examiner

*Primary Examiner* — Mark K Zimmerman
*Assistant Examiner* — Jonathan M Cofino
(74) *Attorney, Agent, or Firm* — Blank Rome LLP (57) ABSTRACT

Systems, methods, and computer readable media to implement tessellation edge shaders. Various embodiments receive tessellation patch information that includes patch information and shared edges for the patches. Based on the received patch information, edge tessellation levels for the shared edges may be determined and used to modify edge tessellation levels initially computed for the shared edges. The various embodiments can then generate vertices for a shared edge with the updated edge tessellation levels to adjoin the shared edges without forming cracks. The vertices may be used to render a surface of an object within a digital image or a sequence of digital images.

18 Claims, 6 Drawing Sheets

TESSELLATION EDGE SHADERS

BACKGROUND

This disclosure relates generally to graphics processing. More particularly, but not by way of limitation, this disclosure relates to the development and implementation of a tessellation shading stage that utilizes tessellation edge shaders.

Computers and other computing systems typically have at least one programmable processing element that is generally known as a central processing unit (CPU) and other programmable processors that are used for specialized processing of various types, such as graphics processing operations. Programmable processors specialized to perform graphics processing operations are typically called graphics processing units (GPUs). GPUs generally comprise multiple cores or processing elements designed to execute the same instruction on parallel data streams, making them more effective than general-purpose CPUs for operations that process large blocks of data in parallel. In general, a CPU functions as a host and hands-off specialized parallel tasks to the GPUs. For instance, a CPU may execute an application stored in system memory that includes viewable objects for display. Rather than processing the graphics data associated with the viewable objects, the CPU may forward the graphics data to the GPU for graphics processing.

To perform graphics processing, GPUs commonly use programs called shader programs or shaders. Common examples of shaders, include but are not limited to, pixel shaders, vertex shaders, geometry shaders, and tessellation shaders. Regarding tessellation shaders, modern graphics application program interfaces (APIs), such as OPENGL and DIRECT3D contain a tessellation shading stage that transforms abstracted patches into geometric primitives (OPENGL is a registered trademark of the Silicon Graphics, Inc. DIRECT3D is a registered trademark of the Microsoft Corporation). One possible issue with current tessellation shading stages involves cracking, which refers to the creation of gaps between adjacent patches at patch boundaries. The lack of continuity between patches from cracking may degrade image quality and cause visual artifacts on an object's surface. As such, improving the tessellation shading stage to account for cracking may be beneficial for the graphics rendering process.

SUMMARY

In one embodiment, the disclosed subject matter provides a method to implement tessellation edge shaders. The method includes receiving tessellation patch information indicative that a first edge of a first patch and a second edge of a second patch form a shared edge at a patch boundary. Based on the received patch information, the method generates a common edge tessellation level for the shared edge based on the received tessellation patch information and updates an edge tessellation level for the first edge and an edge tessellation level for the second edge with the common edge tessellation level. The method then generates a common set of vertices for the first edge and the second edge based on the common edge tessellation level.

In another embodiment, the method implements tessellation edge shaders. The method includes receiving tessellation patch information indicative that a first edge of a first tessellation patch and a second edge of a second tessellation patch form a shared edge at a patch boundary and determines a common edge tessellation level for the shared edge based on the received tessellation patch information. The method then modifies a first edge tessellation level for the first edge and a second edge tessellation level for the second edge with the common edge tessellation level and generates one or more common vertices for the first edge and the second edge with the common edge tessellation level to form the shared edge. The one or more common vertices adjoin the first edge with the second edge without forming cracks. Afterwards, the method renders a surface of an object with at least the common vertices for the shared edge.

In yet another embodiment, the method reduces cracking for shared edges at patch boundaries. This approach involves obtaining a list of patches and the edges shared between different patches. Rather than processing each patch independently, the method sets the adjoining patch edges to have the same edge tessellation level and generates the same vertex positions and other vertex attributes to render the adjoining patch edges. The method uses a shared edge vertex memory buffer to store the vertex attributes of the adjoining patch edges, and uses a separate non-shared edge vertex memory buffer to store vertex attributes of non-shared edges of abstracted patches. To access the different memory buffers, the method also constructs an index list that retains information that references the memory buffers that store the vertex indices.

In one or more embodiments, each of the above described methods, and variation thereof, may be implemented as a series of computer executable instructions. Such instructions may use any one or more convenient programming language. Such instructions may be collected into modules and/or programs and stored in any media that is readable and executable by a computer system or other programmable control device.

DETAILED DESCRIPTION

This disclosure includes various example embodiments that utilize tessellation edge shaders to remove cracks at patch boundaries. Cracks can occur when a common edge between two patches have different edge tessellation levels. To remove cracking in accordance with this disclosure, tessellation edge shaders may generate a set of vertices for a shared edge at the patch boundaries. The tessellation edge shaders can also obtain a list of patches and the edges shared between different patches. Rather than processing each patch independently, the tessellation edge shaders set adjoining patch edges to have the same edge tessellation level and provides the same generated vertex positions and other vertex attributes to render the adjoining patch edges. A shared edge vertex memory buffer (e.g., cache memory) may store the vertex attributes for the shared edges of adjoining patch edges. A separate non-shared edge vertex memory buffer may be used to store vertex attributes of non-shared patch vertices. To support reading vertex data (e.g., draw calls) from multiple vertex buffers simultaneously, an index list may be used to retain information that identifies the set of vertex indices along with a vertex-buffer selector that references the memory buffers that store their respective vertex indices. As used herein, the term "edge tessellation level" refers to number of vertices for a patch's edge.

In the following description, for purposes of explanation, numerous specific details are set forth in order to provide a thorough understanding of the inventive concept. As part of this description, some of this disclosure's drawings represent structures and devices in block diagram form in order to avoid obscuring the invention. In the interest of clarity, not all features of an actual implementation are described. Moreover, the language used in this disclosure has been principally selected for readability and instructional purposes, and may not have been selected to delineate or circumscribe the inventive subject matter or resort to the claims being necessary to determine such inventive subject matter. Reference in this disclosure to "one embodiment" or to "an embodiment" means that a particular feature, structure, or characteristic described in connection with the embodiment is included in at least one embodiment of the invention, and multiple references to "one embodiment" or "an embodiment" should not be understood as necessarily all referring to the same embodiment.

It will be appreciated that in the development of any actual implementation (as in any development project), numerous decisions must be made to achieve the developers' specific goals (e.g., compliance with system- and business-related constraints), and that these goals may vary from one implementation to another. It will also be appreciated that such development efforts might be complex and time-consuming, but would nevertheless be a routine undertaking for those of ordinary skill in the design and implementation of detecting motion having the benefit of this disclosure.

Figure 1:
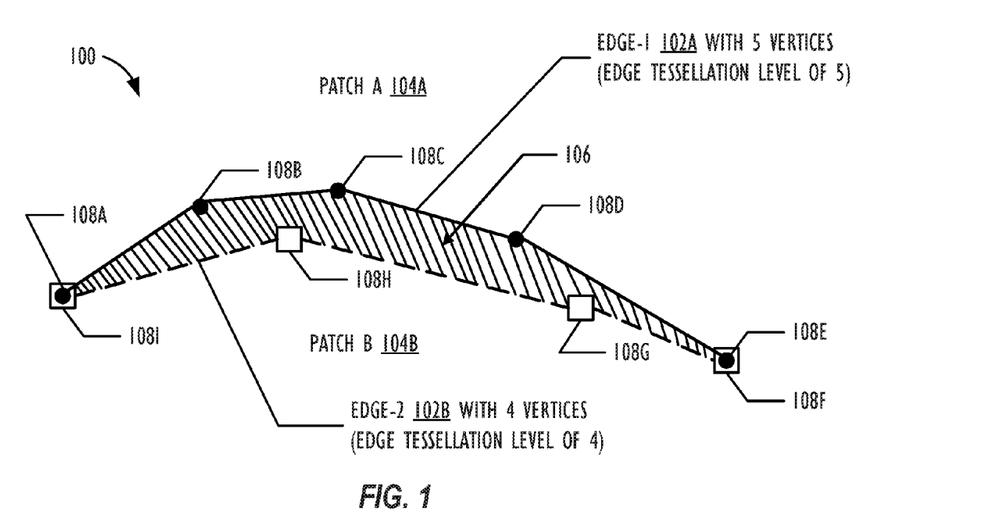
FIG. 1 is an illustration of an embodiment of a patch boundary that includes a shared edge from two different patches.

FIG. 1 is an illustration of an embodiment of a patch boundary 100 that includes an edge-1 102A from patch A 104A and edge-2 102B from patch B 104B. Patches 104A and 104B may be collectively referred to as patches 104 and edges 102A and 102B may be collectively referred to edges 102. The patch boundary 100 corresponds to an area, line, or some other indicator that marks the separation between patches 104. Patches 104 may correspond to a section of an object's surface. A tessellation shading stage may transform patches 104 into primitives that can be rendered by subdividing each patch 104 into smaller geometric primitives and interconnecting the smaller geometric primitives together. In particular, the tessellation shading stage may add new vertices, provide geometric information such as vertex location in a two dimensional (2D) and/or three dimensional space (3D), and provide topological information that represent how to connect the different vertices. By doing so, the tessellation shading stage is able to improve an object's surface resolution.

As shown in FIG. 1, a crack 106 may exist between edge-1 102A and edge-2 102B at patch boundary 100. Edge-1 102A and edge-2 102B represent adjoining patch edges for patch A 104A and patch B 104B. Cracking at adjoining patch edges 102 may occur when the edge tessellation level for edge-1 102A differs from the edge tessellation level for edge-2 102B. In FIG. 1, edge-1 102A may have an edge tessellation level of five and the edge-2 102B may have an edge tessellation level of four. Generally, APIs, such as OPENGL and DIRECT3D, may abstract patches 104 independently from each other to create adjoining patch edges 102 with varying edge tessellation levels and vertex attributes (e.g., vertex locations). By way of example, a computing application may independently specify the number of tessellation coordinates generated through tessellation levels for each patch. The tessellation levels may then dictate how many coordinates are generated around the patch edges 102 and the interior of patches 104. Abstracting each patch 104 individually can cause varying edge tessellation levels and locations of each of the vertices 108 A-I that often lead to a crack 106 that creates gaps and produces a lack of continuity over an object's surface.

Figure 2:
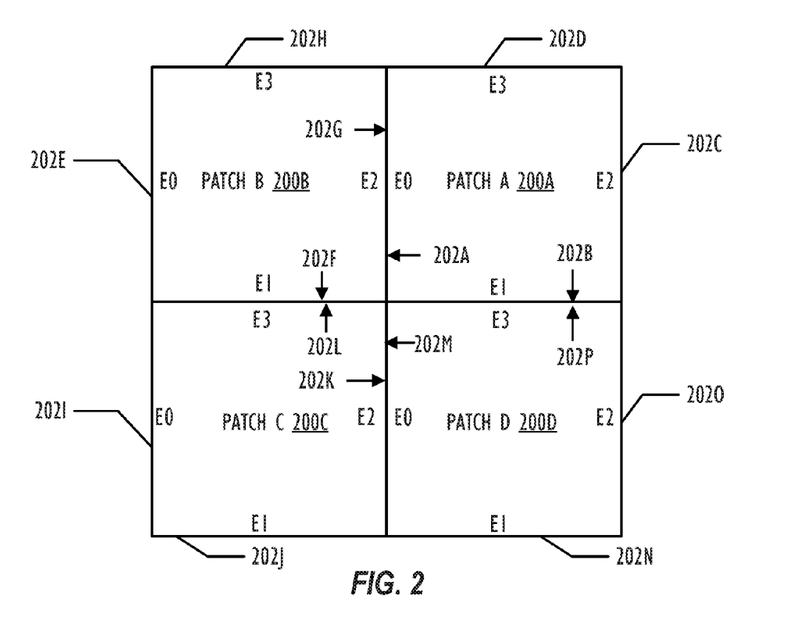
FIG. 2 is an illustration of multiple adjacent patches with adjoining patch edges that do not form cracks.

FIG. 2 is an illustration of multiple adjacent patches 200 A-D with adjoining patch edges 202 A-P that do not form cracks. Patches 200A-D may be collectively referred to as patches 200 and edges 202 A-P may be collectively referred to edges 202. As shown in FIG. 2, patch A 200A is adjacent to both patch B 200B and patch C 200C; patch B 200B is adjacent to both patch A 200A and patch C 200C; patch C 200C is adjacent to both patch A 200A and patch D 200D; and patch D 200D is adjacent to both patch B 200B and patch C 200C. In FIG. 2, each of the patches A-D 200 may be a quad patch with a rectangle shape that has four different edges 202. FIG. 2 illustrates that each of the edges 202 for a given patch 200 (e.g., patch A 200) are labelled as E0, E1, E2, and E3.

Based on the location and orientation for each of the patches A-D 200, there are four sets of edges 202 that share edges at different patch boundaries. Table 1, which is shown below, provides an embodiment of an adjacent edge table that contains information regarding the adjoining patch edges 202 for patches A-D 200. The first row of the adjacent edge table may be interpreted to mean that patch A's E0 edge 202A is adjacent to patch B's E2 edge 202G; the second row may be interpreted to mean that patch B's E1 edge 202F is adjacent to patch C's E3 edge 202L; the third row may be interpreted to mean that patch C's E2 edge 202K is adjacent to patch D's E0 edge 202M; and the fourth row may be interpreted to mean that patch D's E3 edge 202P is adjacent to patch A's E1 edge 202B. A programmer and/or a modelling tool, such as MAYA, may generate the information regarding the adjoining patch edges 202 for patches A-D 200 found within the adjacent edge table. (MAYA is a registered trademark of AutoDesk Inc.) In one embodiment, the adjacent edge table may also include an edge tessellation level column to include the value of the edge tessellation level for each patch edge 202. For example, in the first row of the adjacent edge table, patch A's E0 edge 202A may have an edge tessellation level represented by the label "A-OL (0)" and patch B's E2 edge 202G may have an edge tessellation level represented by the label "B-OL(2)."

TABLE 1

| | Adjacent Edge Table | | | | | |
|---|---|---|---|---|---|---|
| Table Row | Patch Identifier | Edge | Edge Tess. Level | Patch Identifier | Edge | Edge Tess. Level |
| 1 | A | E0 | A-OL(0) | B | E2 | B-OL(2) |
| 2 | B | E1 | B-OL(1) | C | E3 | C-OL(3) |
| 3 | C | E2 | C-OL(2) | D | E0 | D-OL(4) |
| 4 | D | E3 | D-OL(3) | A | E1 | A-OL(1) |

In one embodiment, the information regarding shared edges 202 for patches A-D 200 may pass to the tessellation shading stage in the form of the adjacent edge table as shown in Table 1. Using the information from the adjacent edge table, the tessellation shading stage may set the edge tessellation level for each pair of adjacent edges 202 to the same level. For example, in the first row of the adjacent edge table, patch A's E0 edge 202A may be set to have the same edge tessellation level as patch B's E2 edge 202G. In other words, to avoid cracking, the adjacent edge table may include edge tessellation level values represented by "A-OL (0)" to be equal to the edge tessellation level values represented by "B-OL(2)." A programmer and/or a modelling tool may provide the values of the edge tessellation level for each of the shared edges for the adjacent edge table. By way of example, a programmer may manually set both A-OL(0) and B-OL(2) to a value of four, both B-OL(1) and C-OL(3) to a value of five, both C-OL(2) and D-OL(4) to value of six, and both D-OL(3) and A-OL(1) to a value of four.

Additionally or alternatively, rather than directly providing the edge tessellation levels for each of the shared edges within the adjacent edge table, the programmer and/or a modelling tool may configure one or more tessellation parameters to determine the edge tessellation level for each of the shared edges. The one or more tessellation parameters may then be sent to the tessellation shading stage to update the edge tessellation levels. In a non-limiting example, the vertices for patch A's E0 edge 202A and the vertices patch B's E2 edge 202G may initially have different edge tessellation levels. Initially, patch A's E0 edge 202A may have an edge tessellation level of four and patch B's E2 edge 202G may have an edge tessellation level of five. The tessellation shading stage may then use one or more tessellation parameters and set the edge tessellation levels for patch A's E0 edge 202A and patch B's E2 edge 202G to be the same. In one embodiment, the tessellation shading stage may set the edge tessellation levels for patch A's E0 edge 202A and patch B's E2 edge 202G to the minimum value of the initial edge tessellation levels (e.g., set to edge tessellation level to a value of four). In another embodiment, the tessellation shading stage may set the edge tessellation level to the maximum value of the initial edge tessellation levels (e.g., set to edge tessellation level to a value of five). Other embodiments of the tessellation shading stage may set the edge tessellation level based on a weighted sum, average, and/or a normalization process.

The tessellation shading stage may then use the updated edge tessellation levels to generate a list of coordinates corresponding to the vertices of the shared edge 202 for the different patches. For example, the tessellation shading stage may provide the coordinates for all adjoining edges listed in Table 1. The list of coordinates may be first computed in a tessellation space. After generating the tessellation coordinates for the shared edge's vertices, the tessellation shading stage may convert the coordinates to a three dimensional space by setting the positions of the vertices of shared edges to be equal. Using FIG. 2 as an example, the tessellation shading stage may set the position of vertices for patch A's E0 edge 202A and patch B's E2 edge 202G to be the equal. The tessellation shading stage may also set other vertex attributes to be the same for shared edges.

In one embodiment, the tessellation shading stage may reduce the number of computations to determine the position of each patch's 200 vertices and/or other vertex attributes by performing a single computation for a pair of shared edges 202. That is, instead of calculating each patch's vertices for each edge 202, the tessellation shading stage may compute the vertices position for one of the shared edges 202 and substitute the patch verticies' position for the other shared edge 202. For example, in a brute force approach for the four patches A-D 200 shown in FIG. 2, the tessellation shading stage may calculate the location of vertices for 16 different edges 202. However, because the tessellation shading stage sets the adjoining edges to be equal and the four patches A-D 200 have four different shared edges 202, the tessellation shading stage may compute vertices information for 12 edges: patch A's {E0, E1, E2, E3} edges 202A-D, patch B's {E0, E1, E3} edges 202 E, 202F, and 202H, patch C's {E0, E1, E2} edges 202 I, 202J, and 202K, and patch D's {E1, E2} edges 202N and 2020. Specifically, tessellation shading stage may substitute the verticies information for patch B's E2 edge 202G with the computed verticies information of patch A's E0 edge 202A, substitute the verticies information for patch C's E3 edge 202 with computed verticies information of patch B's E1 edge 202F, substitute the verticies information for patch D's E0 edge 202M with computer verticies information of patch C's E2 edge 202K, and substitute the verticies information for patch D's E3 edge 202P with computed verticies information of patch A's E1 edge 202B.

Figure 3:
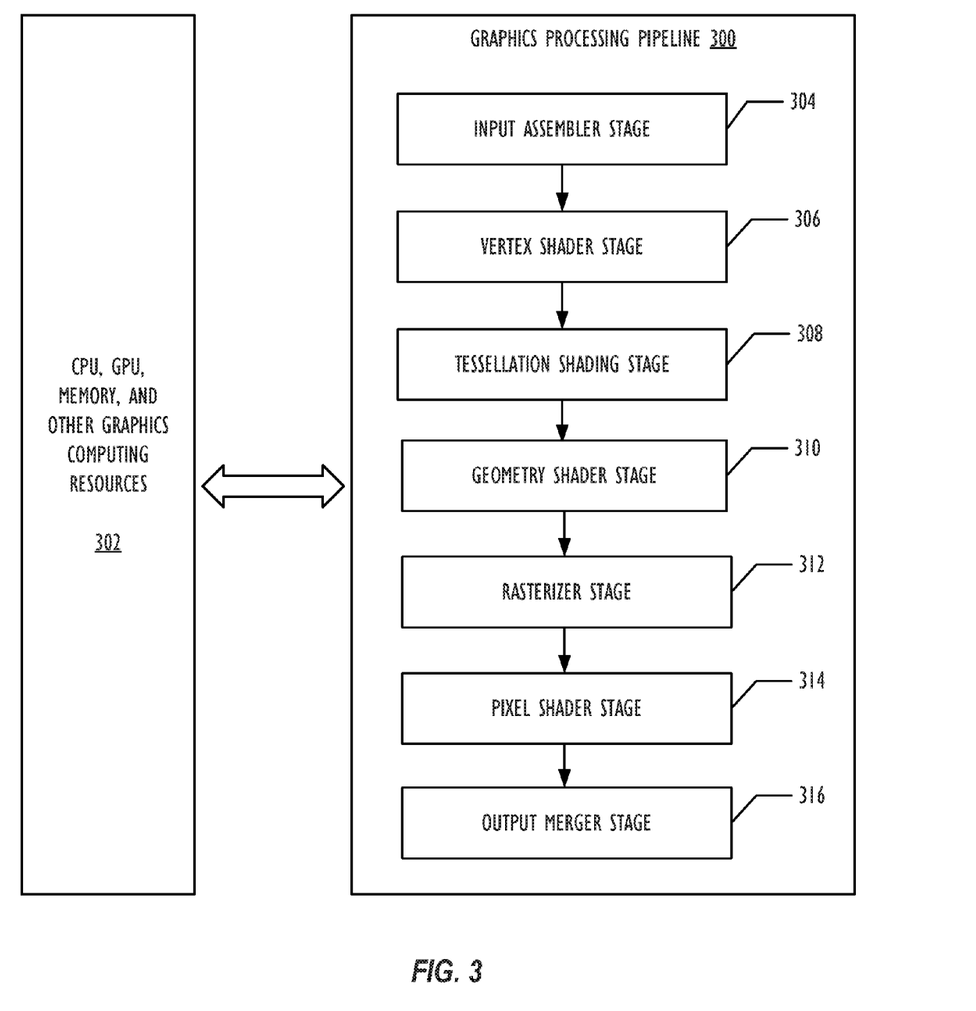
FIG. 3 is a block diagram of a graphics processing pipeline wherein embodiments of the present disclosure may operate.

FIG. 3 is a block diagram of a graphics processing pipeline 300 wherein embodiments of the present disclosure may operate. The graphics processing pipeline 300 may process graphics data corresponding to digital images and/or a sequence of digital images (e.g., a video) for display on an electronic display device (e.g., a liquid crystal display (LCD)). As shown in FIG. 3, the graphics computing resources 302 may implement the graphics processing pipeline 300 using a variety of resources that include, but are not limited to, CPUs, GPUs, memory, other types of integrated circuits (e.g., application specific integrated circuits (ASICs), software, and combinations thereof). Examples of computing systems include, but are not limited to, computers, laptops, wearable electronic devices, video game consoles, television set-top boxes, and/or mobile devices (e.g., smartphones, tablets, and/or other smart devices) may contain the graphic computing resources 302 to execute the graphics processing pipeline 300.

The graphics processing pipeline 300 shown in FIG. 3 may correspond to the DIRECT3D API. FIG. 3 illustrates that the graphics processing pipeline 300 may include an input assembler stage 304, a vertex shader stage 306, a tessellation shading stage 308, a geometry shader stage 310, a rasterizer stage 312, a pixel shader stage 314, and an output merger stage 316. The input assembler stage 304 may be configured to supply graphics data to the graphics processing pipeline 300. For example, the input assembler stage 304 may receive graphics data, such as coordinates and color values for a vertex, from system memory located in the graphics computing resources 302. The graphics processing pipeline 300 may use the graphics data to determine the general layout of patches at the input assembler stage 304.

The next stage of the graphics processing pipeline 300 may involve a vertex shader stage 306. After the input assembler stage 304 supplies the graphics data to the vertex shader stage 306, the vertex shader stage 306 processes the vertices by performing a variety of graphics processing operations, such as transformations, skinning, morphing, and lighting. The tessellation shading stage 308 may receive the processed vertices for the patches from the vertex shader stage 306 and partition the patches into suitable geometric primitives, such as creating interior vertices, for the rendering process. The tessellation shading stage 308 is discussed in more detail in FIG. 4 and FIG. 5.

The geometry shader stage 310 may then receive the vertices of the primitives added to the patches by the tessellation shading stage 308 and generate additional vertices to improve resolution of one or more objects within an image. After processing, the geometry shader stage 310 may supply the generated primitives to the rasterizer stage 312 to convert the geometric primitives into pixels for the purpose of displaying graphics. Specifically, the rasterizer stage 312 may perform graphic processing operations, such as clipping geometric primitives and preparing geometric primitives for a pixel shader by defining the vertices in a coordinate space.

Afterwards, the pixel shader stage 314 may generate pixel data based on the geometric primitives received from the rasterizer stage 312. For example, the pixel shader stage 314 may generate color values, opacity values, lighting values, and other attributes for pixels. The pixel data is then sent to the output merger stage 316 to finalize the pixel data. When finalizing pixel data, the output merger stage 316 may combine depth information for pixels, pixel shading values, and stencil information to output final pixel values. Additionally, the output merger stage 316 may remove pixels that do not need to be displayed. The output merger stage 316 may forward the final pixel output for storing in a memory buffer in the graphics computing resources 302. A display processor for an electronic display device (not shown in FIG. 3) may subsequently retrieve and use the pixel values to display the image on the electronic display device.

Although FIG. 3 illustrates a specific embodiment of a graphics processing pipeline 300, the disclosure is not limited to the specific embodiment illustrated FIG. 3. For example, the graphics processing pipeline 300 may include other graphics processing stages not shown in FIG. 3, but can be found in the graphics framework of the DIRECT3D API. Other embodiments of the graphics processing pipeline 300 may be implemented to conform to other types of APIs, such as OPENGL and Metal (developed by Apple Inc.). For example, in OPENGL the graphics processing pipeline 300 may implement the tessellation shading stage 308 but may include other types of graphic processing stages, such as fragment shader stages. The use and discussion of FIG. 3 is only an example to facilitate ease of description and explanation.

Figure 4:
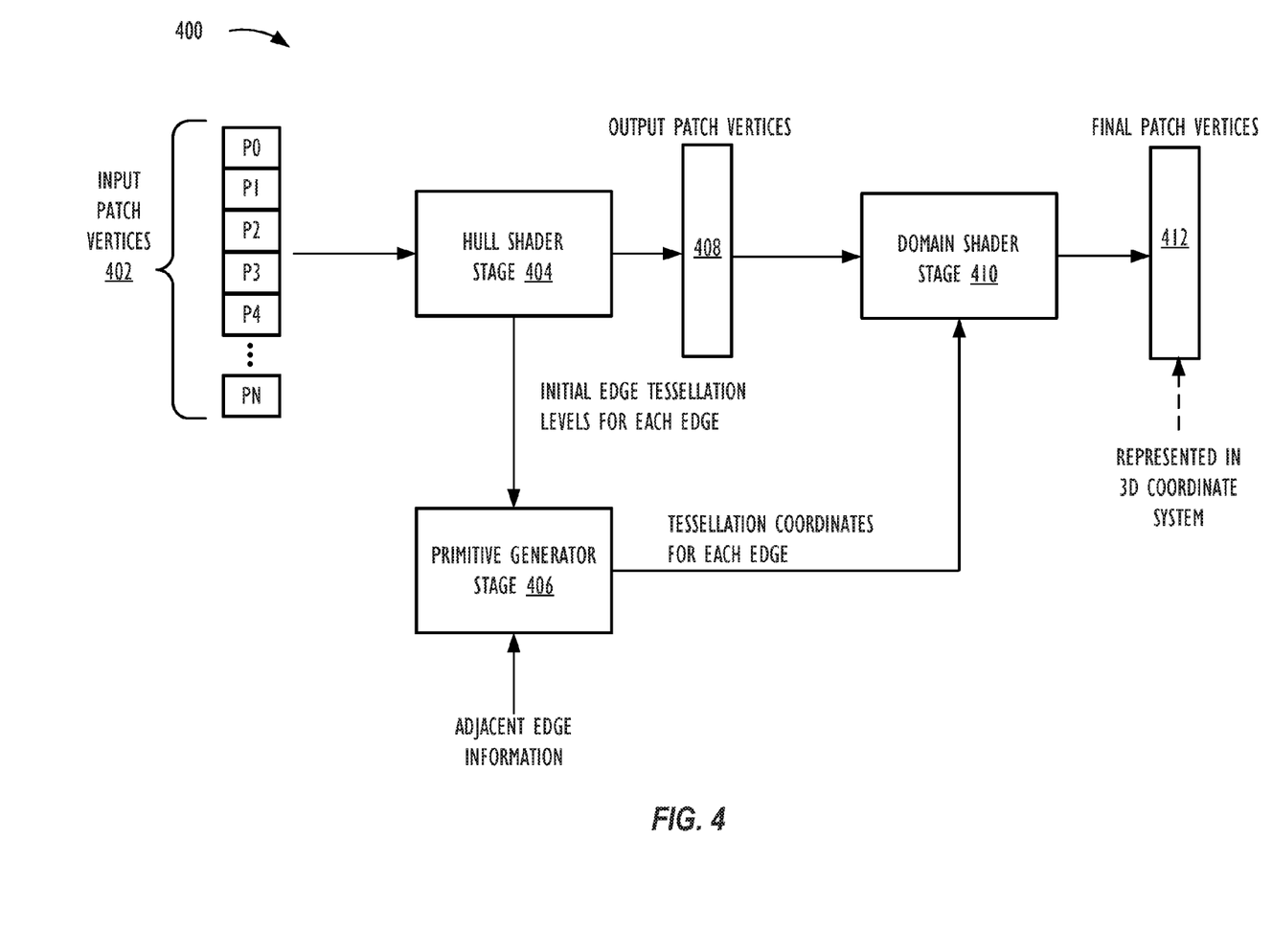
FIG. 4 is a block diagram of a tessellation shading stage that utilizes tessellation edge shaders.

FIG. 4 is a block diagram of an embodiment of a tessellation shading stage 400 that utilizes tessellation edge shaders. Tessellation shading stage 400 may correspond to the tessellation shading stage 308 as shown in FIG. 3. FIG. 4 illustrates that the tessellation shading stage 400 may comprise a hull shader stage 404, a primitive generator stage 406, and a domain shader stage 410. The terms "hull shader" and "domain shader" may be interchanged with and generally referred to within this disclosure as a tessellation control shader and a tessellation evaluation shader, respectively. The "primitive generator" may be interchanged and generally referred to within this disclosure as a "tessellator." The hull shader stage 404 and the domain shader stage 410 may be the two shaders for the tessellation shading stage 400, and the primitive generator stage 406 may be implemented as a fixed-function facility. As shown in FIG. 4, the tessellation shading stage 400 may receive input patch vertices 402 from a vertex shader (e.g., vertex shader stage 306 in FIG. 3). The input patch vertices 402 may include a list of processed vertices for multiple patches (e.g., patches P0-PN shown in FIG. 4).

The hull shader stage 404 may receive the input patch vertices 402 and produce a geometry patch that corresponds to each input patch. The hull shader stage 404 may modify the positions and attributes for the input patch vertices 402 and create and/or remove vertices from one or more patches. The hull shader stage 404 may also utilize various criteria to determine the number of geometric primitives to add to the patch. For example, the hull shader stage 404 may utilize depth and/or distance information to determine the number of geometric primitives to add. Objects that are located further away from a viewer may have a lower number of geometric primitives added than objects located closer to a viewer. Additionally or alternatively, the hull shader stage 404 may determine the number of geometric primitives to add based on the size of the patches. As shown in FIG. 4, the hull shader stage 404 outputs the updated information for the vertices to the domain shader stage 410 as output patch vertices 408. The hull shader stage 404 may also compute initial edge tessellation levels for the patches based on the input patch vertices 402 and subsequently forward the initial edge tessellation levels to the primitive generator stage 406.

The primitive generator stage 406 may receive adjacent edge information that includes a list of the patches and the shared patch edges at patch boundaries to update the edge tessellation level received from the hull shader stage 404. Using the adjacent edge information, the primitive generator stage 406 may update the initial edge tessellation levels received from the hull shader stage 404 by setting the edge tessellation levels for shared patch edges to be the same edge tessellation levels. The values of the edge tessellation level for shared patch edges may be set by a programmer and/or a modelling tool and/or derived from one or more tessellation parameters defined by the programmer and/or modelling tool. Embodiments of the disclosure may set the edge tessellation level for adjoining patch edges based on the minimum, the maximum, the average, the weighted sum, and/or normalization of the initial edge tessellation levels for the adjoining patch edges. Although typically two patches may share a single patch edge, other embodiments could have more than two patches (e.g., three, four, or five patches) that are connected at a single patch edge.

The tessellation shading stage 400 may also employ a primitive generator stage 406 to tessellate patches into a set of smaller set of geometric primitives, generate specific number of tessellation coordinates in a tessellation space (e.g., a unit square for rectangular domains or an equilateral triangle for triangular domains) for the patches, and determine the associated topology and coordinates for the patches. Examples of tessellation coordinates in a tessellation space include tessellation space coordinates for quad domains, barycentric coordinates for triangular domains, and other tessellation domains known by persons of ordinary skill in the art. The coordinates for the vertices of the patches may correspond to tessellation space (e.g., a unit square or a normalized (zero-to-one) coordinate system). For example, an edge for a patch may have vertices with the following coordinates in a tessellation space, {(0, 0), (¼, ¼), (¾, ¾), (1, 1)}. After setting the edge tessellation levels to be the same, the primitive generator stage 406 may generate a single set of coordinates within the tessellation space for each pair of shared edge's vertices and set the location coordinates within the tessellation space for the vertices of each of the shared edges to the single set of coordinates. For example, the primitive generator stage 406 may set the tessellation location coordinates for vertices in patch A's E0 edge and patch B's E2 edge to the same set of tessellation location coordinates.

FIG. 4 illustrates that the domain shader stage 410 may receive inputs from both the primitive generator stage 406 and the hull shader stage 404 and generate vertex positions in a 3D coordinate system, which can also be referred to as a world-space coordinate system. The primitive generator stage 406 may provide the list of edges and vertices and corresponding location coordinates for the vertices in tessellation space, and the hull shader stage 404 may provide output patch vertices 408 that includes the updated vertex information. The domain shader stage 410 may use outputs from the primitive generator stage 406 and the hull shader stage 404 to generate a list of vertices in a 3D space. By doing so, the domain shader stage 410 uses its inputs and creates a mesh of primitives that are added to the patch creating a higher resolution and more detail patch than the patch constructed by the CPU.

The domain shader stage 410 may also act as the tessellation edge shader to ensure that the coordinates, geometry, and/or other attributes for each vertex along common edges are the same. In one embodiment, the domain shader stage 410 may generate a list of vertices and substitute vertex values from one location of the list to another in accordance with the adjacent edge information (e.g., adjacent edge information located within an adjacent edge table as shown in Table 1). For example, the domain shader stage 410 may implicitly determine the topology of the object surface or mesh using the number of vertices for a draw command. The domain shader stage 410 may recognize the adjacent or adjoining edges and compute the vertex information once for the adjoining edges. Rather than computing each patch's vertices for each edge, edges that are adjacent to each other may use the common vertex information, and thereby eliminating redundant computation to obtain vertex information.

Figure 5:
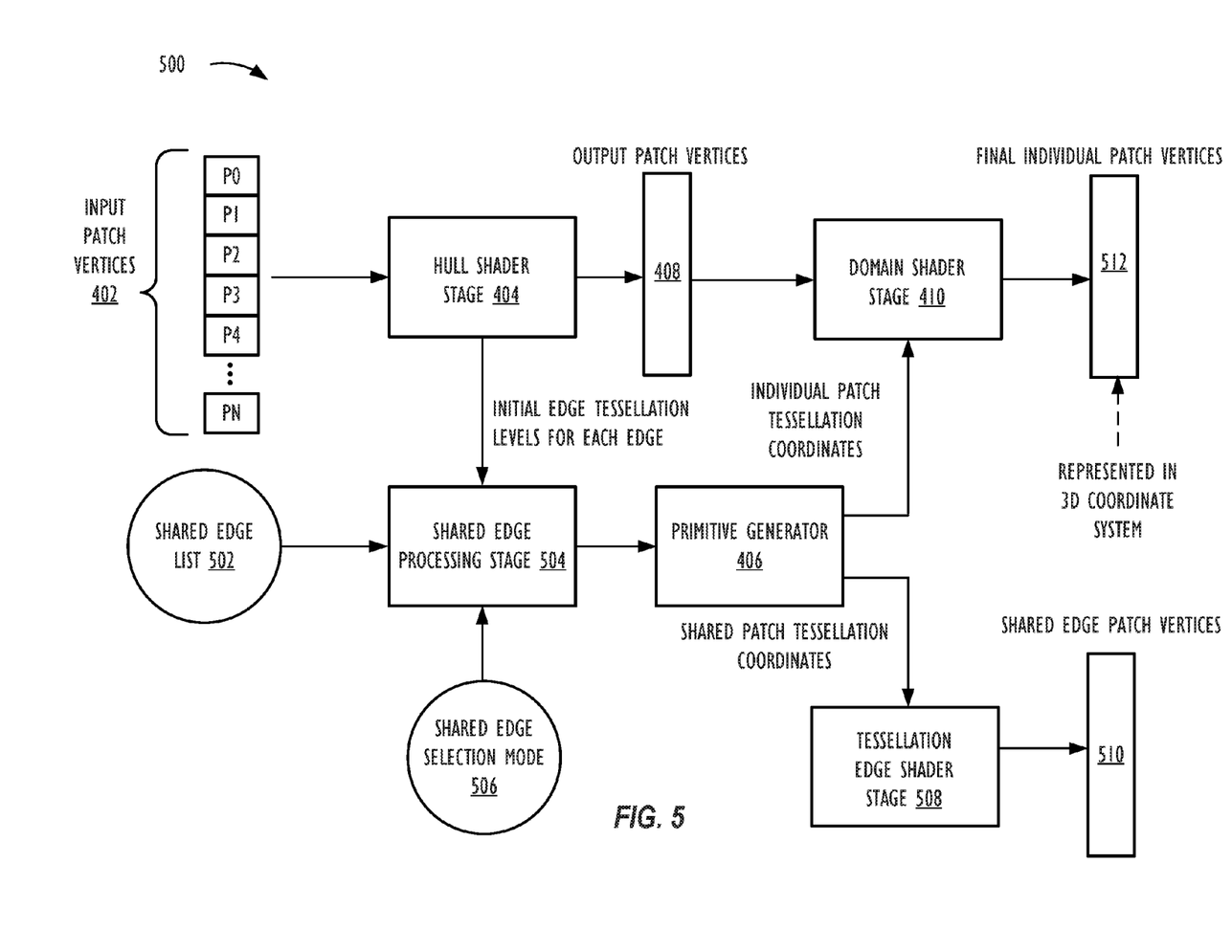
FIG. 5 is a block diagram of a tessellation shading stage that utilizes an index list to access multiple memory vertex buffers.

FIG. 5 is a block diagram of an embodiment of a tessellation shading stage 500 that utilizes an index list to access multiple memory vertex buffers. In addition to the hull shader stage 404, the domain shader stage 410 and the primitive generator stage 406, FIG. 5 illustrates that the tessellation shading stage 500 may also include a shared edge processing stage 504 and a tessellation edge shader stage 508 to process shared edges. Rather than the hull shader stage 404 sending the initial edge tessellation levels to the primitive generator stage 406, the tessellation shading stage 500 can be configured for the hull shader stage 404 to send the initial edge tessellation levels to a shared edge processing stage 504. The shared edge processing stage 504 may subsequently update the edge tessellation levels and output the updated edge tessellation levels to the primitive generator stage 406.

To update the edge tessellation levels, the shared edge processing stage 504 may receive a shared edge list 502 that provides information regarding shared edges for the input patches (e.g., P0-PN shown in FIG. 5). The shared edge processing stage 504 may also receive a shared edge selection mode 506 to determine the edge tessellation levels for the shared edges. For example, the shared edge processing stage 504 may obtain settings that indicate the shared edge processing stage 504 may obtain the updated edge tessellation levels for the shared edges by using a minimum, maximum, and/or average of the initial edge tessellation levels. Recall that the shared edge list 502 and the shared edge selection mode 506 may be directly set by a programmer and/or a modelling tool and/or indirectly set using one or more tessellation parameters set by the programmer and/or a modelling tool. In one embodiment, the shared edge processing stage 504 may generate an adjacent edge table as shown in Table 1 using the shared edge list 502 and the shared edge selection mode 506.

The shared edge processing stage 504 may then replace the initial edge tessellation levels associated with shared patch edges received from the hull shader stage 304 with the updated edge tessellation levels determined from the shared edge list 502 and the shared edge selection mode 506. The shared edge processing stage 504 may not update the edge tessellation levels for non-shared edges. The shared edge processing stage 504 may then forward the updated edge tessellation levels for the shared patch edges and the initial edge tessellation levels for the non-shared patch edges to the primitive generator stage 406. Once the primitive generator stage 406 receives the updated edge tessellation levels, the primitive generator stage 406 can generate the tessellation coordinates for the shared edges and non-shared edges.

As shown in FIG. 5, the primitive generator stage 406 forwards the tessellation coordinates for non-shared edges to the domain shader stage 410 and the tessellation coordinates for the shared edges to the tessellation edge shader stage 508. The tessellation edge shader stage 508 executes the coordinates for the shared edges and does not execute the coordinates for the non-shared edges. The domain shader stage 410 executes the coordinates for the non-shared edges and tessellation coordinates for patch interiors and does not execute the coordinates for the shared edges. The tessellation edge shader stage 508 outputs the shared edge patch vertices 510 that include vertex attributes for the shared edges to a vertex buffer for later use in rendering. For non-shared edges of a patch and its interior tessellation coordinates, domain shader stage 410 outputs the final individual patch vertices 512 and continues with the graphics processing, for example, according to graphics processing pipeline 300 shown in FIG. 3.

When patch shading is completed, geometric primitives (e.g., triangles or lines) may be emitted from the tessellation shading stage 500 by selecting the appropriate vertex attributes from either a shared edge vertex memory buffer (e.g., cache memory) or from a non-shared edge vertex memory buffer. Each of the vertex memory buffers retains the vertex information for the different types of edges. Specifically, the shared edge vertex memory buffer may store the vertex information for shared edges and the non-shared edge vertex memory buffer may store the vertex information for the non-shared edges and/or interior edges. After retrieving the vertex attributes from the corresponding vertex memory buffer, the geometric primitives are processed according the remaining portions of the graphics processing pipeline.

Instead of using a single memory buffer whose entries are sequential to one another, vertex data may be stored in multiple vertex memory buffers. For example, if triangles are the geometric primitives, a draw call directly to the non-shared or shared vertex memory buffer cannot be made because the graphics processing pipeline is unable to determine if the sequential vertices in one of the vertex memory buffers are the desired vertices. To determine which vertex memory buffer stores the appropriate vertex attributes, an index list may retain the topology and identify the vertices.

In one embodiment, the index list may be implemented as shown in Table 2 below. Table 2 provides an index list that identifies which memory buffer and which entry in the memory buffer to use. In Table 2, the list identifier (ID) represents the identifier value for identifying the memory buffer (e.g., shared or non-shared cache memory) and the index no. represents the identifier value for identifying the entry and/or slot number in the memory buffer. For example, if triangles are the geometric primitive shape, then a draw call may be made to the index list, where each call identifies three entries that correspond to three of the vertices of the triangle: "Draw(a, b, c)." Here, each of the call entries (e.g., 'a') points to a specific cache and a specific entry in that cache (e.g., the 10th entry in the 'non-shared edge cache').

TABLE 2

Index List

| Call entry | Cache identifier | Cache entry |
|---|---|---|
| a | List_ID | Index No. |
| b | List_ID | Index No. |
| c | List_ID | Index No. |
| d | List_ID | Index No. |
| e | List_ID | Index No. |
| f | List_ID | Index No. |
| ... | List_ID | Index No. |
| z | List_ID | Index No. |

Based on the index list shown in Table 2, each vertex may be described by a tuple of values, for example, {List_ID [vertex buffer identifier], Index No. [entry/slot number in the vertex buffer]}. In another embodiment, rather than using the index list in Table 2, the list may compose of sequence that includes a single List_ID and the vertices to read from the list in order to improve space efficiency. As long as the List_ID and vertex indices do not conflict (e.g., have the same value), then the single list performs the same function as an index list that is based on Table 2, but potentially provides memory space savings.

Figure 6:
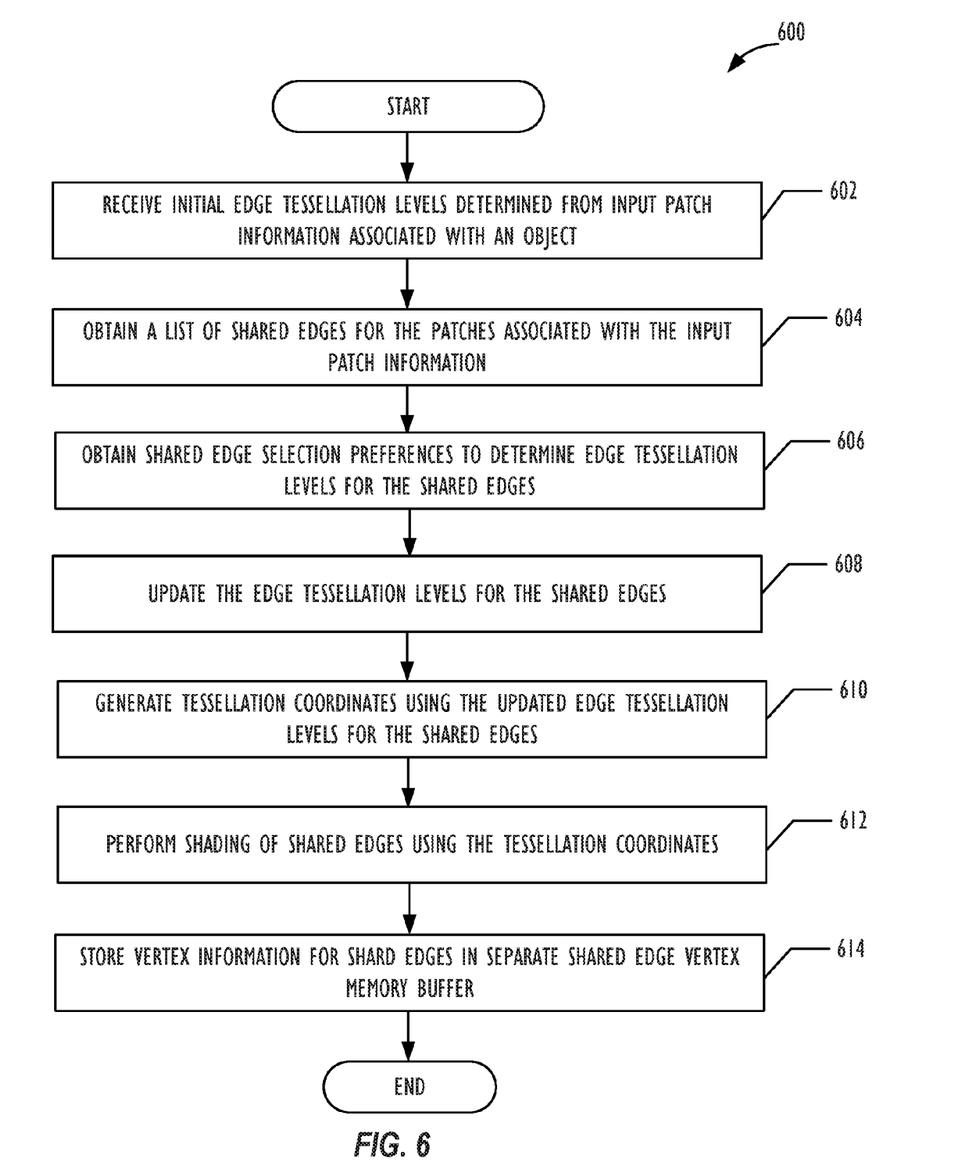
FIG. 6 illustrates a tessellation operation that utilize tessellation edge shaders in accordance with one embodiment.

FIG. 6 illustrates a tessellation operation 600 that utilizes tessellation edge shaders in accordance with one embodiment. The tessellation operation 600 may be implemented as part of a graphics processing pipeline for graphics API, such as OPENGL, DIRECT3D, and Metal. Using FIG. 3 as an example, the tessellation operation 600 may be part of the tessellation shader stage 308. In particular, embodiments of the tessellation operation 600 may be implemented using the tessellation shader stage 400 and tessellation shader stage 500. A variety of computing systems that include but are not limited to computers, laptops, wearable electronic devices, video game consoles, television set-top boxes, and/or mobile devices (e.g., smartphones, tablets, and/or other smart devices) may be configured to execute a graphics processing pipeline that includes the tessellation operation 600.

The tessellation operation 600 can start at block 602 by receiving initial edge tessellation levels determined from input patch information associated with an object. The initial edge tessellation levels may correspond to independent abstraction of patches that could create adjoining patch edges with varying edge tessellation levels and vertex attributes. For example, the varying edge tessellation levels may result from a computing application that independently specifies the number tessellation coordinates for each patch to determine the number of vertices generated for the patch edges and the interior of patches. The input patch information may include a list of processed vertices for multiple patches from a previous vertex shader stage.

The tessellation operation 600 may then move to block 604 and obtain a list of shared edges for the patches associated with the input patch information. A programmer and/or a modelling tool may generate the list of shared edges for the tessellation operation 600. The list of shared edges may include a list of the patches and the shared patch edges at different patch boundaries. The tessellation operation 600 may continue to block 606 and obtain shared edge selection preferences to determine the edge tessellation levels for the shared edges. For example, the shared edge selection preferences may indicate the preferences to use a minimum, maximum, average, weighted sum, and/or normalization of the initial edge tessellation levels received in block 602 when computing updated edge tessellation levels for the shared edges. In another embodiment, rather than providing selection preferences, a programmer may manually provide the actual updated edge tessellation levels for each of the shared edges within the list.

The tessellation operation 600 may proceed to block 608 and update the edge tessellation levels for the shared edges according to the shared edge selection preferences. In one embodiment, the tessellation operation 600 may generate information regarding the shared edges and edge tessellation levels similar to the adjacent edge table shown in Table 1. Using Table 1 as an example, for the first row of shared edges, patch A's E0 edge 202 may be set to have the same edge tessellation level as patch B's E2 edge 202. In other words, the edge tessellation level represented by "A-OL(0)" and "B-OL(2)" may initially have the different values or the same values. The tessellation operation 600 at block 608 may then update the values of "A-OL(0)" and "B-OL(2)" to the same edge tessellation levels based on the shared edge selection preferences. In one embodiment, the tessellation operation 600 may perform an initial check to determine whether the edge tessellation levels are about the same. If the check determines the edge tessellation level are about the same, the tessellation operation 600 may skip updating the values. The tessellation operation 600 may then move to block 610 and generate tessellation coordinates using the updated edge tessellation levels for the shared edges. The list of tessellation coordinates may be in the tessellation space, such as a normalized coordinate system.

Afterwards, the tessellation operation 600 may continue to block 612 and perform shading of shared edges using the tessellation coordinates. At block 612, the tessellation operation 600 may receive the tessellation coordinates and vertices to determine output patch vertex positions. In one embodiment, the tessellation operation 600 may reduce the number of computations to determine each patch's vertex positions and/or the attributes by performing a single computation for each of the shared edges. For example, using FIG. 2 as an example, tessellation operation 600 may substitute the verticies position information for patch B's E2 edge 202 with the computed verticies position information of patch A's E0 edge 202.

The tessellation operation 600 may then move to block 614 and store vertex information for shared edges in a separate shared edge vertex memory buffer. Instead of using a single memory buffer whose entries are sequential to one another, the vertex data may be stored in multiple vertex memory buffers. For example, the tessellation operation 600 may store the vertex information for non-shared edges and interior sections of the patches in a different non-shared edge vertex memory buffer. To determine which vertex memory buffer stores the appropriate vertex attributes, an index list may retain the topology and identify the vertices. Implementing an index list may support reading vertex data from multiple vertex buffers simultaneously.

As used herein, the term "patch" refers to a generalized geometric primitive with vertices that connect to each other in any way. For example the patch may have some of its vertices interconnect to form a triangle, while other vertices in the patch interconnect to form a square. The number of vertices may also vary from one patch to another patch.

As used herein, the term "computing system" refers to a single electronic computing device or to two or more electronic computing devices working together to perform the function described as being performed on or by the computing system.

Figure 7:
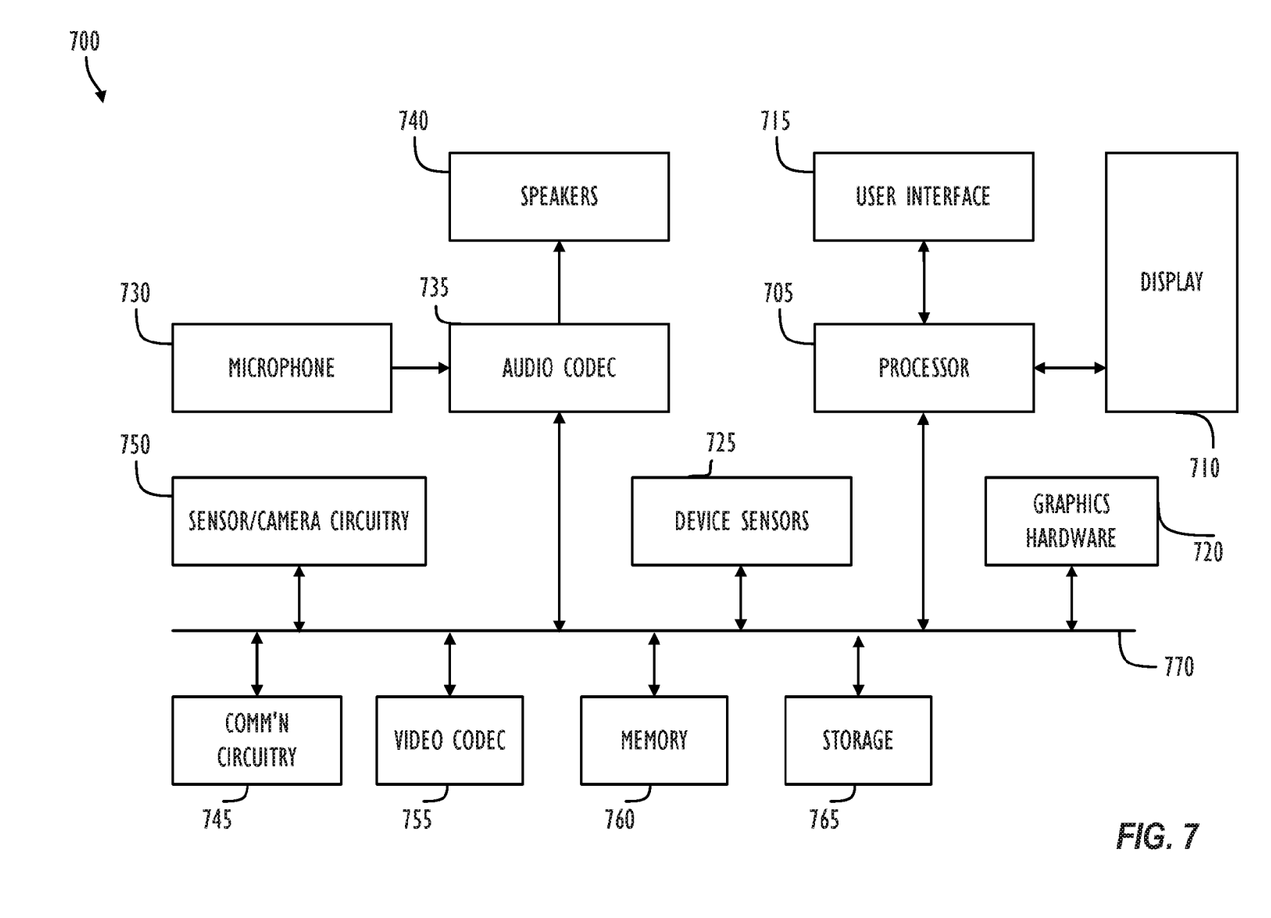
FIG. 7 shows a simplified functional block diagram of an electronic device in accordance with one embodiment.

Referring to FIG. 7, a simplified functional block diagram of illustrative electronic device 700 that implements a tessellation shader stage that utilizes tessellation edge shatters as described in FIGS. 3-5. Electronic device 700 may include processor 705, display 710, user interface 715, graphics hardware 720, device sensors 725 (e.g., proximity sensor/ambient light sensor, accelerometer and/or gyroscope), microphone 730, audio codec(s) 735, speaker(s) 740, communications circuitry 745, digital image capture unit 750, video codec(s) 755, memory 760, storage 765, and communications bus 770. Electronic device 700 may be, for example, a digital camera, a personal digital assistant (PDA), personal music player, mobile telephone, server computing system, notebook computing system, laptop computing system, desktop computing system, or tablet computer computing system. More particularly, the disclosed techniques may be executed on a device that includes some or all of the components of device 700.

Processor 705 may execute instructions necessary to carry out or control the operation of many functions performed by device 700. Processor 705 may, for instance, drive display 710 and receive user input from user interface 715. User interface 715 can take a variety of forms, such as a button, keypad, dial, a click wheel, keyboard, display screen, a touch screen, or combinations thereof. Processor 705 may also, for example, be a system-on-chip such as those found in mobile devices and include a dedicated GPU. Processor 705 may be based on reduced instruction-set computer (RISC) or complex instruction-set computer (CISC) architectures or any other suitable architecture and may include one or more processing cores. Graphics hardware 720 may be special purpose computational hardware for processing graphics and/or assisting processor 705 to process graphics information. In one embodiment, graphics hardware 720 may include a programmable GPU.

Sensor and camera circuitry 750 may capture still and video images that may be processed, at least in part, in accordance with the disclosed techniques by video codec(s) 755 and/or processor 705 and/or graphics hardware 720, and/or a dedicated image processing unit incorporated within circuitry 750. Images so captured may be stored in memory 760 and/or storage 765. Memory 760 may include one or more different types of media used by processor 705 and graphics hardware 720 to perform device functions. For example, memory 760 may include memory cache, read-only memory (ROM), and/or random access memory (RAM). Storage 765 may store media (e.g., audio, image and video files), computer program instructions or software, preference information, device profile information, and any other suitable data. Storage 765 may include one or more non-transitory storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Memory 760 and storage 765 may be used to tangibly retain computer program instructions or code organized into one or more modules and written in any desired computer programming language. When executed by, for example, processor 705 such computer program code may implement one or more of the operations described herein.

It is to be understood that the above description is intended to be illustrative, and not restrictive. The material has been presented to enable any person skilled in the art to make and use the claimed subject matter as described herein, and is provided in the context of particular embodiments, variations of which will be readily apparent to those skilled in the art (e.g., some of the disclosed embodiments may be used in combination with each other). For example, while FIG. 3 have been described in the context of Direct3D® API, this is not necessary. In addition, some of the described operations may have their individual steps performed in an order different from, or in conjunction with other steps, that presented herein. More generally, if there is hardware support some operations described in conjunction with FIGS. 3-5 may be performed in parallel.

At least one embodiment is disclosed and variations, combinations, and/or modifications of the embodiment(s) and/or features of the embodiment(s) may be understood by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations may be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). The use of the term "about" means±10% of the subsequent number, unless otherwise stated.

Many other embodiments will be apparent to those of skill in the art upon reviewing the above description. The scope of the invention therefore should be determined with reference to the appended claims, along with the full scope of equivalents to which such claims are entitled. In the appended claims, the terms "including" and "in which" are used as the plain-English equivalents of the respective terms "comprising" and "wherein."

What is claimed is:

1. A non-transitory program storage device, readable by one or more programmable control devices and comprising instructions stored thereon to cause one or more programmable control devices to:
    receive tessellation patch information indicative that a first edge of a first patch and a second edge of a second patch form a shared edge at a patch boundary;
    receive tessellation patch information for an edge of the first patch and an edge of the second patch that form separate and un-shared edges between the first and second patches;
    generate a common edge tessellation level for the shared edge based on the received tessellation patch information;
    replace, prior to tessellating the first patch and the second patch into smaller geometric primitives, at least one of an initial edge tessellation level for the first edge and an initial edge tessellation level for the second edge with the common edge tessellation level;
    generate a common set of vertices for the first edge and the second edge based on the common edge tessellation level;
    generate a first set of geometric primitives for the first patch and a second set of geometric primitives for the second patch based on the common set of vertices;
    store vertex information for the common set of vertices in a first memory buffer that does not include vertex information for the separate and un-shared edges;
    store the vertex information for the separate and un-shared edges within a second memory buffer; and
    create an index list that maps received vertex information to the first memory buffer or the second memory buffer based on whether the received vertex information corresponds to the shared edge or the separate and un-shared edge.

2. The non-transitory program storage device of claim 1, wherein the common edge tessellation level differs from the initial edge tessellation level for the first edge and the initial edge tessellation level for the second edge.

3. The non-transitory program storage device of claim 1, wherein tessellation patch information includes a list of shared edges between the first patch and the second patch and a shared edge selection mode.

4. The non-transitory program storage device of claim 3, wherein the shared edge selection mode causes the common edge tessellation level to be based on an average of the initial edge tessellation level for the first edge and the initial edge tessellation level for the second edge.

5. The non-transitory program storage device of claim 1, wherein the instructions to cause the one or more programmable control devices to generate a common set of vertices comprise instructions to cause the one or more programmable control devices to:
  determine a number of vertices for the shared edge;
  generate tessellation coordinates for each of the shared edge vertices based on the common edge tessellation level, wherein the tessellation coordinates correspond to unit square coordinates;
  determine a vertex position value for each of the shared edge vertices based on the tessellation coordinates, wherein each vertex position value corresponds to three-dimensional space coordinates; and
  set the determined vertex position values as vertex positions for the first edge and the second edge.

6. The non-transitory program storage device of claim 1, wherein the instructions to cause the one or more programmable control devices to generate a common edge tessellation level comprises:
  identify a number of vertices of the first edge based on the tessellation patch information;
  identify a number of vertices of the second edge based on the tessellation patch information; and
  set the number of vertices for the shared edge based on an average of the number of vertices of the first edge and the number of vertices of the second edge.

7. The non-transitory program storage device of claim 1, wherein the instructions to cause the one or more programmable control devices to generate a common set of vertices comprise instructions to cause the one or more programmable control devices to:
  determine a number of vertices for the shared edge;
  generate tessellation coordinates for each of the shared edge vertices based on the common edge tessellation level, wherein the tessellation coordinates correspond to normalized coordinates;
  determine a vertex position value for each of the shared edge vertices based on the tessellation coordinates, wherein each vertex position value corresponds to three-dimensional space coordinates; and
  set the determined vertex position values as vertex positions for the first edge and the second edge.

8. A system comprising:
memory; and
one or more processors operable to interact with an image capture device and the memory, wherein instructions stored within the memory cause the one or more processors to:
  receive tessellation patch information indicative that a first edge of a first tessellation patch and a second edge of a second tessellation patch form a shared edge at a patch boundary;
  receive tessellation patch information for an edge of the first tessellation patch and an edge of the second tessellation patch that form unshared edges between the first tessellation patch and the second tessellation patch;
  determine a common edge tessellation level for the shared edge based on the received tessellation patch information;
  replace, prior to subdividing the first tessellation patch and the second tessellation patch into smaller geometric primitives, at least one of an initial edge tessellation level for the first edge and an initial edge tessellation level for the second edge with the common edge tessellation level;
  generate one or more common vertices for the first edge and the second edge with the common edge tessellation level to form the shared edge;
  tessellate the first tessellation patch and the second tessellation patch with the one or more common vertices;
  store vertex information for the one or more common vertices in a first memory buffer that does not include vertex information for the unshared edges;
  store the vertex information for the unshared edges within a second memory buffer; and
  create an index list that maps received vertex information to the first memory buffer or the second memory buffer based on whether the received vertex information corresponds to the shared edge or the unshared edge.

9. The system of claim 8, wherein tessellation patch information includes a list of shared edges between the first tessellation patch and the second tessellation patch and a shared edge selection mode that causes the common edge tessellation level to be based on an average of the initial edge tessellation level for the first edge and the initial edge tessellation level for the second edge.

10. The system of claim 9, wherein the common edge tessellation level differs from the initial edge tessellation level for the first edge and the initial edge tessellation level for the second edge.

11. The system of claim 8, wherein the instructions that cause the one or more processors to generate a common set of vertices further comprise instructions that further cause the one or more processors to:
  determine a number of vertices for the shared edge;
  generate tessellation coordinates for each of the shared edge vertices based on the common edge tessellation level, wherein the tessellation coordinates correspond to unit square coordinates;
  determine a vertex position value for each of the shared edge vertices based on the tessellation coordinates, wherein each vertex position value corresponds to three-dimensional space coordinates; and
  set the determined vertex position values as vertex positions for the first edge and the second edge.

12. The system of claim 11, wherein the instructions that cause the one or more processors to generate a common edge tessellation level further comprise instructions that further cause the one or more processors to:
  identify a number of vertices of the first edge based on the tessellation patch information;
  identify a number of vertices of the second edge based on the tessellation patch information; and
  set the number of vertices for the shared edge based on an average of the number of vertices of the first edge and the number of vertices of the second edge.

13. The system of claim 8, wherein the instructions that cause the one or more processors to generate a common set of vertices further comprise instructions that further cause the one or more processors to:
- determine a number of vertices for the shared edge;
- generate tessellation coordinates for each of the shared edge vertices based on the common edge tessellation level, wherein the tessellation coordinates correspond to normalized coordinates;
- determine a vertex position value for each of the shared edge vertices based on the tessellation coordinates, wherein each vertex position value corresponds to a three-dimensional space coordinate system; and
- set the determined vertex position values as vertex positions for the first edge and the second edge.

14. A computer-implemented method comprising:
- receiving tessellation patch information indicative that a first edge of a first patch and a second edge of a second patch form a shared edge at a patch boundary;
- receiving tessellation patch information for an edge of the first patch and an edge of the second patch that form separate and un-shared edges between the first and second patches;
- generating a common edge tessellation level for the shared edge based on the received tessellation patch information;
- replacing, prior to tessellating the first patch and the second patch into smaller geometric primitives, at least one an first initial edge tessellation level for the first edge and an initial edge tessellation level for the second edge with the common edge tessellation level; and
- generating a common set of vertices for the first edge and the second edge based on the common edge tessellation level;
- generating a first set of smaller geometric primitives for the first patch and a second set of smaller geometric primitives for the second patch based on the common set of vertices storing vertex information for the common set of vertices in a first memory buffer that does not include vertex information for the separate and un-shared edges;
- storing the vertex information for the separate and un-shared edges within a second memory buffer; and
- creating an index list that maps received vertex information to the first memory buffer or the second memory buffer based on whether the received vertex information corresponds to the shared edge or the separate and un-shared edge.

15. The method of claim 14, wherein the common edge tessellation level differs from the initial edge tessellation level for the first edge and the initial edge tessellation level for the second edge.

16. The method of claim 14, wherein generating a common edge tessellation level comprises:
- identifying a number of vertices of the first edge based on the tessellation patch information;
- identifying a number of vertices of the second edge based on the tessellation patch information; and
- setting the number of vertices for the shared edge based on an average of the number of vertices of the first edge and the number of vertices of the second edge.

17. The method of claim 14, further comprising:
- determining a number of vertices for the shared edge;
- generating tessellation coordinates for each of the shared edge vertices based on the common edge tessellation level, wherein the tessellation coordinates correspond to unit square coordinates;
- determining a vertex position value for each of the shared edge vertices based on the tessellation coordinates, wherein each vertex position value corresponds to three-dimensional space coordinates; and
- setting the determined vertex position values as vertex positions for the first edge and the second edge.

18. The method of claim 14, further comprising:
- determining a number of vertices for the shared edge;
- generating tessellation coordinates for each of the shared edge vertices based on the common edge tessellation level, wherein the tessellation coordinates correspond to normalized coordinates;
- determining a vertex position value for each of the shared edge vertices based on the tessellation coordinates, wherein each vertex position value corresponds to three-dimensional space coordinates; and
- setting the determined vertex position values as vertex positions for the first edge and the second edge.

\* \* \* \* \*

UNITED STATES PATENT AND TRADEMARK OFFICE
CERTIFICATE OF CORRECTION

PATENT NO. : 10,535,188 B2
APPLICATION NO. : 15/275152
DATED : January 14, 2020
INVENTOR(S) : David R. Shreiner Page 1 of 1

It is certified that error appears in the above-identified patent and that said Letters Patent is hereby corrected as shown below:

In the Claims

Claim 14, Column 17, Line 29: Replace the phrase "one an first initial edge tessellation" with the phrase --one of an initial edge tessellation--

Signed and Sealed this
Twenty-first Day of April, 2020

Andrei Iancu
*Director of the United States Patent and Trademark Office*